(12) United States Patent
Calilung et al.

(10) Patent No.: US 6,389,929 B1
(45) Date of Patent: May 21, 2002

(54) ELONGATED ROTATABLE HANDGRIP

(75) Inventors: Ryan A. Calilung, Chicago; Andrew J. Caron, Brookfield, both of IL (US)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 09/315,172

(22) Filed: May 20, 1999

(51) Int. Cl.[7] ............................................. B62K 21/26
(52) U.S. Cl. ........................ 74/551.9; 16/110.1; 81/489; 74/502.2; 74/489
(58) Field of Search ............................ 74/551.8, 551.9; 474/80; 16/110.1; 272/67; 81/489

(56) References Cited

U.S. PATENT DOCUMENTS

| | | |
|---|---|---|
| 2,874,587 A | 2/1959 | Schmid |
| 4,900,291 A * | 2/1990 | Patterson ...................... 474/80 |
| 4,938,733 A | 7/1990 | Patterson |
| 4,982,950 A * | 1/1991 | Petrosky ...................... 272/67 |
| 5,102,372 A | 4/1992 | Patterson et al. |
| 5,197,927 A | 3/1993 | Patterson et al. |
| 5,315,891 A | 5/1994 | Tagawa |
| 5,564,316 A | 10/1996 | Larson et al. |
| 5,584,213 A * | 12/1996 | Larson et al. ............... 74/551.9 |
| 5,588,925 A | 12/1996 | Arbeiter |
| 5,819,594 A * | 10/1998 | Sjovall ....................... 74/551.9 |
| 6,006,625 A * | 12/1999 | Nagashima ................ 74/501.6 |

FOREIGN PATENT DOCUMENTS

| | | | |
|---|---|---|---|
| DE | 892559 | * 10/1953 | ................ 74/551.9 |
| DE | 892 559 | 10/1953 | |
| DE | 19702788 A1 * | 7/1998 | ................ 74/551.9 |
| EP | 0893335 A2 * | 1/1999 | ................ 74/551.9 |
| GB | 341107 | 10/1929 | |
| JP | 5-32191 | * 2/1993 | ................ 74/551.9 |

OTHER PUBLICATIONS

PCT International Search Report, Oct. 4, 2000.

* cited by examiner

Primary Examiner—Vinh T. Luong
(74) Attorney, Agent, or Firm—Milan Milosevic; Lisa Wunderlich

(57) ABSTRACT

An elongated rotatable handgrip for use in actuating mechanisms on handlebar-steered vehicles that is readily engaged from an outboard hand position on the handlebar. The rotatable handgrip is mounted coaxially over the handlebar inboard of a stationary grip, having a length that is greater than that of the stationary grip, and is formed of a deformable material to improve torque transmission.

4 Claims, 4 Drawing Sheets

ELONGATED ROTATABLE HANDGRIP

TECHNICAL FIELD OF THE INVENTION

This invention relates to rotatable handgrips for actuating devices used on handlebar-steered vehicles. More particularly, it relates to elongated rotatable handgrips that are readily engaged from an outboard hand position on the handlebar.

DESCRIPTION OF RELATED ART INCLUDING INFORMATION DISCLOSED UNDER 37 CFR 1.97 AND 37 CFR 1.98

Rotatable handgrips are typically used on bicycles to actuate both internal and external gear shifting mechanisms such as hubs and derailleurs, respectively, and on motorcycles to actuate carburetor throttle bodies. On bicycles, thumb and index finger actuated lever-type shifting devices supported on the handlebar are also commonly used. Such lever devices, however, require the removal of one or more fingers from the handgrip in order to operate the levers to shift gears. This, of course, may contribute to the loss of steering control of the bicycle. With the advent of rotatable handgrip shifters or twistshifters, riders are now able to shift gears without releasing their fingers from the handgrip thereby maintaining improved steering control of the bicycle.

Bicycle twistshifters may embody either fill-length rotatable handgrips, similar to motorcycle throttles, or partial-length rotatable handgrips located inboard of stationary grips. One such inboard shift actuator is disclosed in U.S. Pat. No. 4,900,291 issued Feb. 13, 1990 and commonly assigned to SRAM Corporation. Other commonly assigned patents which disclose rotatable shift actuators mounted on a handlebar inboard of stationary handgrips include U.S. Pat. No. 4,938,733 issued Jul. 3, 1990, U.S. Pat. No. 5,102,372 issued Apr. 7, 1992, U.S. Pat. No. 5,197,927 issued Mar. 30, 1993, U.S. Pat. No. 5,564,316 issued Oct. 15, 1996, and U.S. Pat. No. 5,584,213 issued Dec. 17, 1996. A rotatable shifter embodying a full-length handgrip extending to the end of the handlebar is shown in U.S. Pat. No. 2,874,587 issued Feb. 24, 1959.

Twistshifters embodying conventional inboard and full-length rotatable grips, however, do have functional drawbacks. Twistshifters with full-length grips may contribute to loss of rider control due to inadvertent shifts under hard braking or acceleration or from jolts when riding on uneven surfaces. Inboard twistshifters greatly improved rider steering control by allowing stationary grips to be positioned symmetrically outboard of the rotatable grips. This allows the rider to shift the rotatable grip with the inboard fingers while maintaining a secure grip on the stationary grip with the rest of the hand. Nevertheless, conventional inboard twistshifters may be disadvantageous under emergency steering conditions such as when the front wheel of the bicycle hits an obstacle or catches a rut in the terrain. Under such circumstances, the rider instinctively slides his hands to a more stable outboard position on the handlebar for improved steering control, albeit away from the rotatable handgrip. This is an especially common occurrence when riding a mountain bike in off-road conditions where even under non-emergency conditions a rider negotiating the bicycle over rocks and fallen trees will want to shift his hands further outboard to maintain better steering control. Bar ends, secured to the outboard ends of handlebars and commonly used on mountain bikes, provide convenient stops when shifting the hands outwardly or away from the frame of the bicycle. In doing so, quite often the rider temporarily looses the ability to shift gears and must wait till the end of the maneuver before first repositioning his hands inboard over the rotatable grip and then shifting into the proper gear. This results in a potentially dangerous riding situation where the rider is forced to negotiate an obstacle in the wrong gear or, even worse, attempts to both slide his hands inboard and shift gears during the maneuver itself. Accordingly, this unnecessary risk can be eliminated by providing the rider with the ability to shift gears effectively and instinctively regardless of the rider's hand position on the handlebar and in all riding situations.

SUMMARY OF THE INVENTION

It is an object of this invention to provide a rotatable handgrip that permits a rider to readily actuate a control mechanism from a more outboard hand position on the gripping surface of a handlebar. It is another object of this invention to provide a rotatable handgrip that is readily engaged from any hand position on the gripping surface of the handlebar.

In accordance with this invention, an actuating device including an elongated rotatable grip is provided that sufficiently extends further outboard toward the end of the handlebar to permit a rider to actuate a response mechanism with his hands positioned further outboard on the handlebar.

According to another aspect of the invention, a hand rotatable grip for mounting on a handlebar having a longitudinal axis includes a body having a first region with a first radius, and adapted to be grasped by an index finger of a rider. A second region adjoining the first region has a second radius greater than the first radius and is adapted to be grasped by a middle finger of the rider's hand. A third region of the body adjoining an outboard end of the second region has a third radius less than the second radius, and is adaptable to be grasped by the ring and little fingers of a rider's hand. This grip forms an ergonomic torque-transmitting surface for all of the digits of a rider's hand.

BRIEF DESCRIPTION OF THE DRAWINGS

Further aspects of the invention and their advantages will be discerned with reference to the appended drawings, in which like characters identify like parts and in which.

DETAILED DESCRIPTION OF ILLUSTRATED EMBODIMENT

Figure 1:
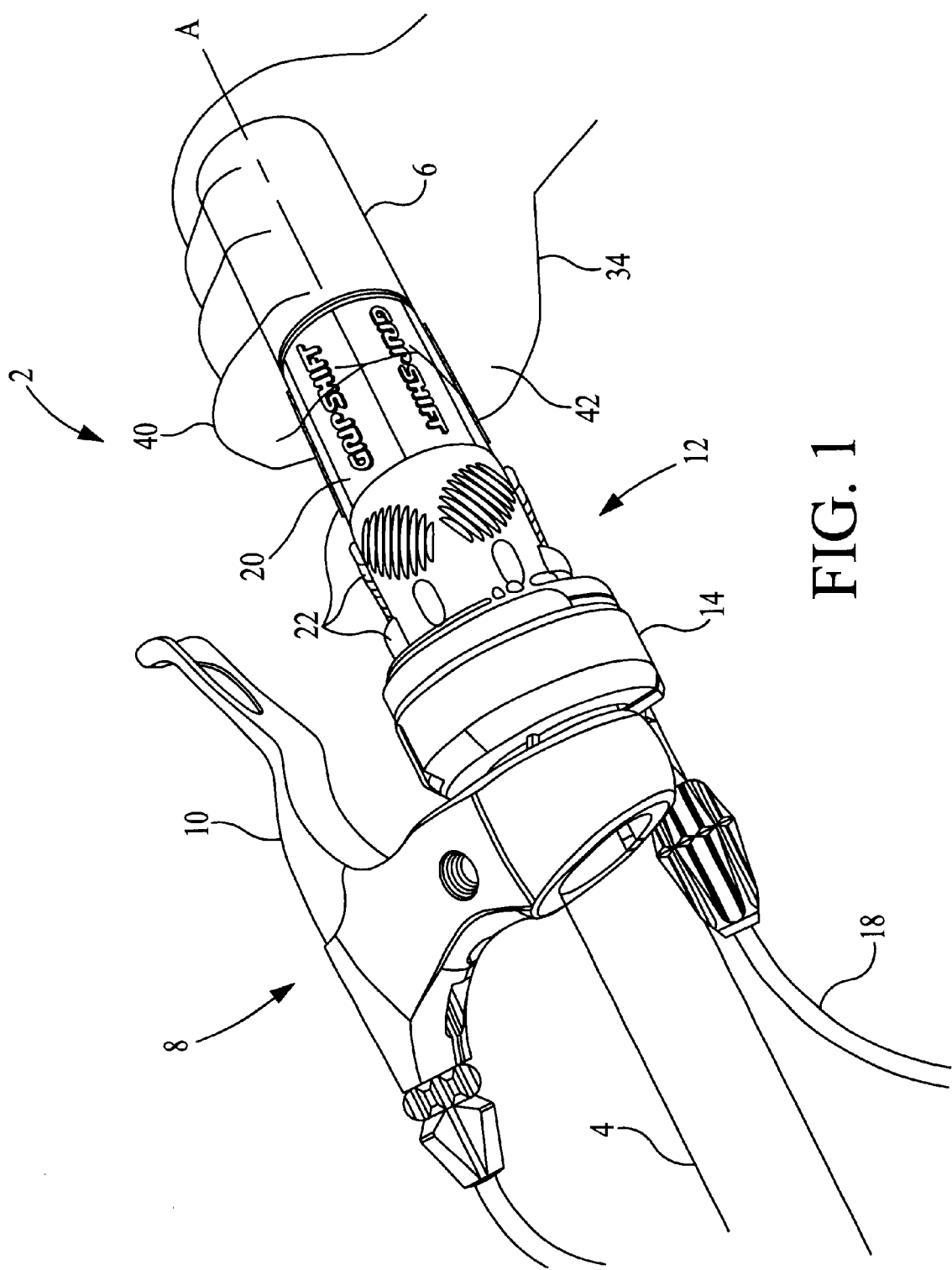
FIG. 1 is a perspective view of the right-hand side of a bicycle handlebar control assembly including a gear shift actuator having an elongated rotatable handgrip according to the invention.
Figure 2:
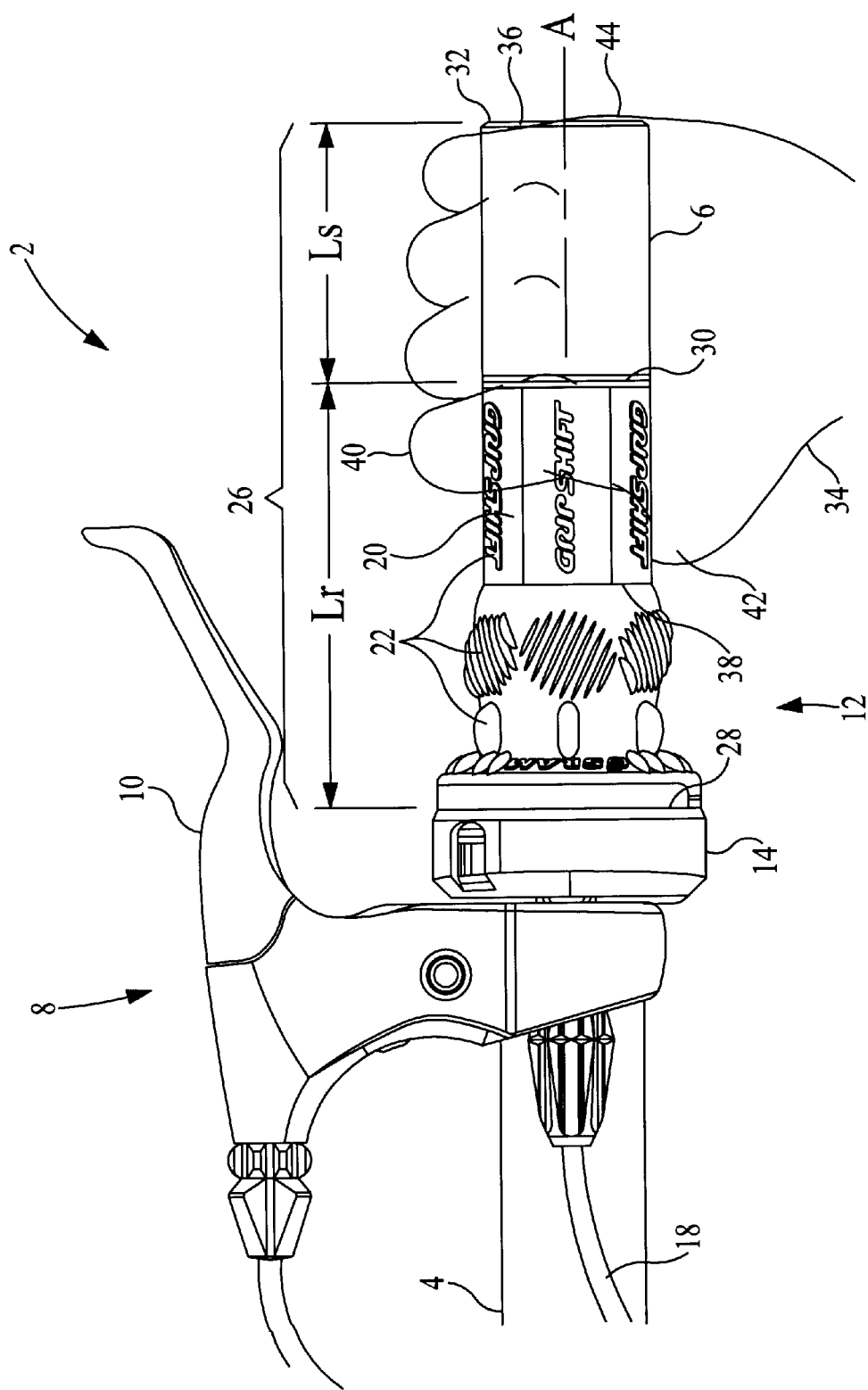
FIG. 2 is a top view of the handlebar assembly of FIG. 1.

Referring to FIGS. 1 and 2, an elongated rotatable grip for the actuation of a bicycle gear shift system in accordance with a preferred embodiment of this invention will be described. A bicycle control assembly is shown generally at 2. Mounted at the end of a handlebar 4 having a center axis A is a customary handgrip 6 that is completely fixed relative to the handlebar. Also mounted and secured to the handlebar 4 is a brake operating mechanism 8 which includes a pivotally mounted operating handle 10. Coaxially received over the handlebar 4 between the stationary grip 6 and the brake operating mechanism 8 is a rotatable handgrip actuating mechanism 12 for a bicycle gear shift device (not shown).

The rotatable grip actuating mechanism 12 includes a housing 14 fixed to the handlebar 4 and a rotatable handgrip 20 operatively connected to a Bowden-cable assembly 18 for actuation of the gear shift system, handgrip 20 being disposed between the stationary grip 6 and the housing 14. As further shown in FIG. 4, the rotatable grip 20 according to a preferred embodiment is formed as a hollow cylindrical member of a somewhat resilient material having a soft feel. A preferred material for forming grip 20 is a thermoplastic elastomer such as KRATON® manufactured by Shell. The material of which the grip 20 is formed is stretched such that the grip may be positioned over a rigid cylindrical member 24 which is coaxially mounted about and rotated relative to the handlebar 4 to actuate the Bowden cable. When released, the elastomeric material of grip 20 tightly grips the surface of the rigid member 24. As shown in FIGS. 1-4, the outer surface of the rotatable grip 20 includes upstanding deformable features 22 that engage with the crooks of a rider's hand to enhance torque transmission.

Referring again to FIG. 2, a handgrip assembly 26 comprising rotatable and stationary grips 20 and 6, respectively, will be described. A length Lr of the rotatable grip 20 is defined along handlebar center axis A from an inboard end 28 where the grip 20 meets housing 14 to an outboard end 30 where the grip 20 meets the stationary grip 6. A length Ls of the stationary grip 6 is likewise defined along handlebar axis A but from the outboard end 30 of grip 20 to an outboard end 32 of grip 6, end 32 in FIG. 2 being coincident with an outboard end 36 of the handlebar 4. Note that both handgrips 20 and 6 must be graspable by a portion of a rider's hand 34 along their respective lengths Lr and Ls. Typically for most bicycles, the total graspable handgrip length Lr+Ls is in the range of 5 to 5¾ inches.

In conventional inboard twistshifters, however, the rotatable grip 20 is typically far shorter than the stationary grip 6. For example, referring to FIG. 2, in a conventional inboard twistshifter, the outboard end of the rotatable grip 20 will typically be located at line 38 and not at end 30 as is the case in this invention. In other words, in a conventional inboard twistshifter the portion of the rotatable grip 20 with the "GRIPSHIFT" markings would be part of the stationary grip 6. So configured, a rider with his hands positioned in an outboard position, as shown in FIG. 2, would not be able shift gears without first sliding his hands inwardly until positioned above a portion of the truncated rotatable grip 20. According to this invention, however, the ratio of Lr/Ls is greater than one. So configured, the length of the rotatable grip 20 is extended such that a rider is able to shift with his hands positioned further outboard. In another preferred embodiment of the invention, as shown in FIG. 2, at least the rider's index finger 40 and thumb 42 are positioned about the rotatable grip 20 with an outboard edge 44 of the rider's hand 34 positioned at the outboard end 32 of the stationary grip 6. In a preferred embodiment of the invention, assuming a total grasping surface length Lr–Ls of 5¾ inches, Lr is approximately 3 inches yielding a Lr/Ls ratio of 1.1.

The rotatable grip 20 has three regions having different radii for being gripped by different fingers of the rider's hand when the rider's hand is in an inboardmost position. A first region 50 (see FIG. 3) has a length $Lr_1$ in the range of 0.45 to 0.80 inches, preferably about 0.65 inches, and a radius $r_1$ in the range of 0.45 to 0.80 inches and preferably 0.65 inches. The region 50 is adaptable to receive the index finger 40 of the rider's hand, and the radius $r_1$ is chosen to comfortably fit to the arc made by index finger 40 when grasping the region 50. A second region 52 has a length $Lr_2$ in the range of 0.60 to 1.10 inches, preferably about 0.85 inches, and a radius $r_2$ in the range of 0.60 to 0.85 inches and preferably 0.75 inches. Region 52 is provided to receive the middle finger 54 of the rider's hand, which is longer than the index finger 40. Radius $r_2$ is therefore chosen to be larger than radius $r_1$ such that the arc made by middle finger 54 will more comfortably fit to this surface.

A third region 56 adjoins region 52 on its outboard end, with line 38 being the approximate boundary. Region 56 has a length $Lr_3$ in the range of 1.00 inches to 2.25 inches, preferably about 1.55 inches, and a radius $r_3$ in the range of 0.45 inches to 0.80 inches and preferably about 0.65 inches. Region 56 is substantially longer than either regions 50 or 52 as it is designed to receive the ring and little fingers 58 and 60 of the rider's hand. Since the ring finger 58 is somewhat shorter than middle finger 54, and since the little finger 60 is considerably shorter, the radius $r_3$ is selected to be less than radius $r_2$, such that the arcs made by fingers 58 and 60 will be more comfortably fit to the surface of region 56. In general, the more arc of grip 20 which can be grasped by a finger, the more oppositional clamping force which can be applied by that finger, and thus the more torque can be transmitted as a function of that clamping force and the coefficient of friction of the grip surface.

Figure 3:
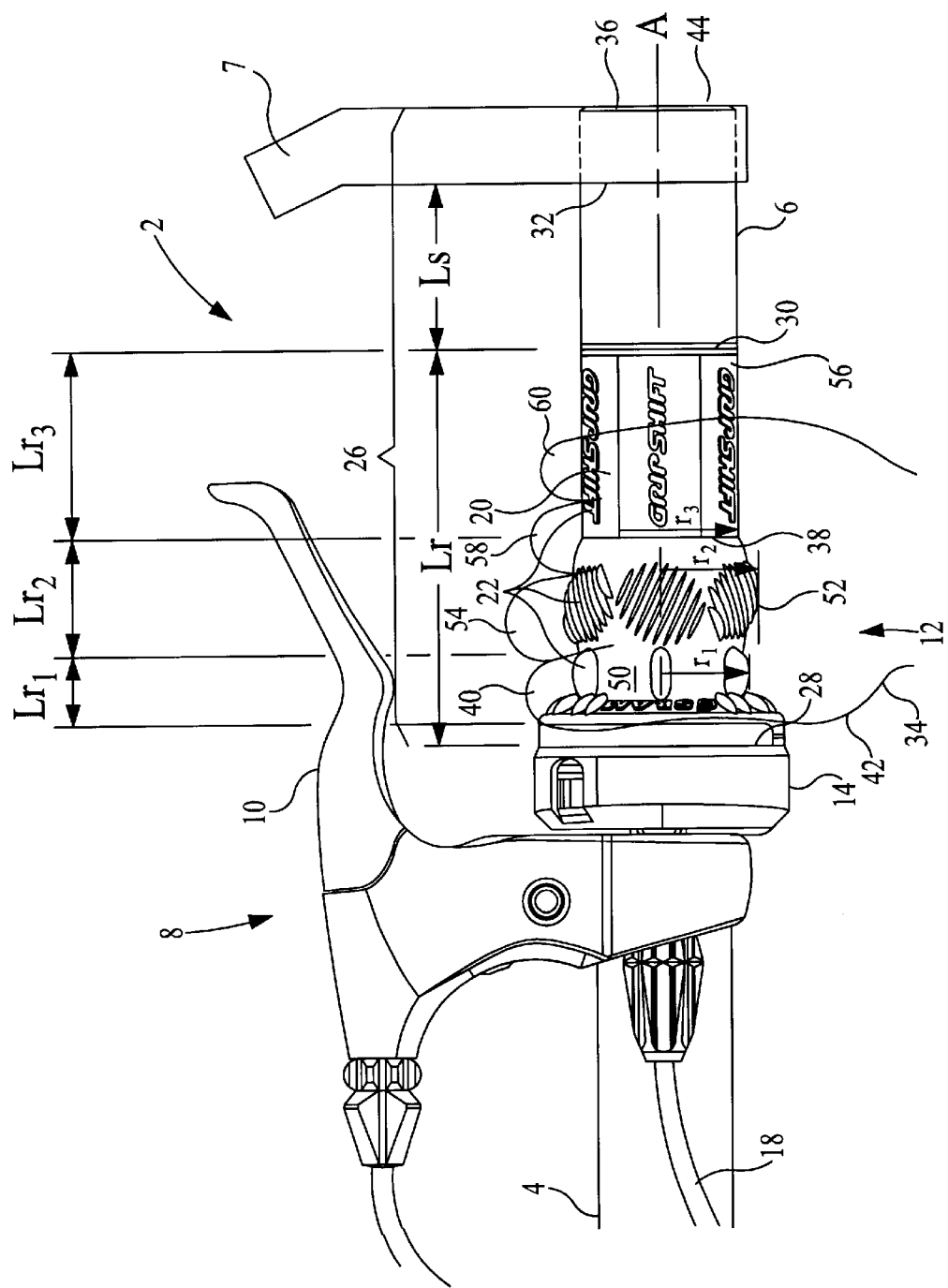
FIG. 3 is a top view of a handlebar assembly according to the invention as including a bar end and showing a rider's hand in an inboard position.
Figure 4:
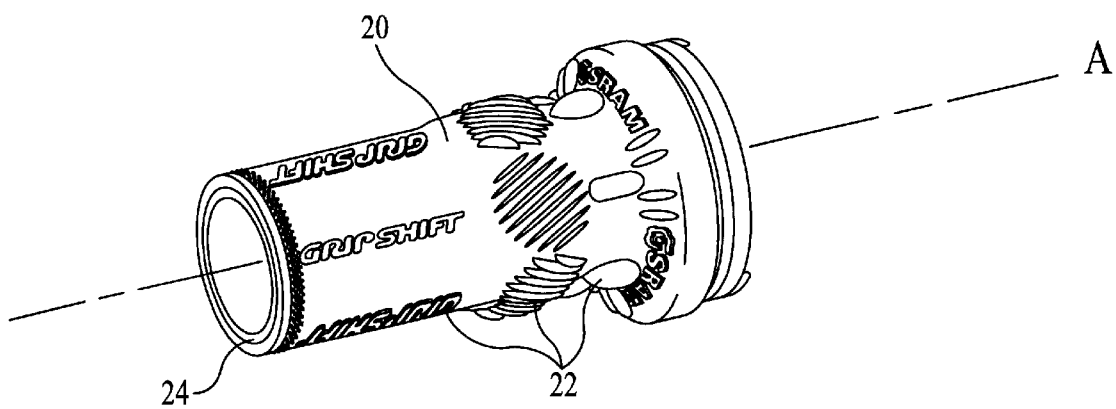
FIG. 4 is a perspective view of an elongated rotatable handgrip according to the invention.

FIG. 3 also shows a common handlebar configuration in which a bar end 7 is mounted on the end 36 of the handlebar 4. Bar end 7 is typically a cylindrical member which extends orthogonally from the handlebar 4 and then curves inwardly. The bar end 7 creates an outboard stop for the rider's hand 34.

While the present invention has been described with respect to gear shift and throttle applications, it may serve as an actuating device for other mechanically or hydraulically controlled apparatus. Accordingly, the present invention is not limited by the illustrated embodiments but by the scope and spirit of the claims which follow.

We claim:

1. A hand-rotatable grip for mounting coaxially about a handlebar having a center axis, said hand-rotatable grip disposed inboard of a stationary grip mounted coaxially about the handlebar, a length of said rotatable grip along the handlebar axis being greater than a length of said stationary grip along the handlebar axis such that a ratio of the length of the hand-rotatable grip to the length of the stationary grip is at least 1.1, the stationary grip having an outer diameter substantially equal to an outer diameter of an outboard of the hand-rotatable grip.

2. The hand-rotatable grip of claim 1, wherein said hand-rotatable grip further comprises a deformable outer layer mounted over a hollow rigid inner layer.

3. A handgrip assembly for a handlebar-controlled vehicle, the handgrip assembly comprising:

a stationary grip mounted axially about a handlebar having a longitudinal axis, the stationary grip having an inboard end; and a hand-rotatable grip mounted coaxially about the handlebar axis and to adjoin the inboard end of the stationary grip, a length of the hand-rotatable grip along the axis being greater than a length of the stationary grip along the handlebar axis such that a ratio of the length of the hand-rotatable grip to the length of the stationary grip is at least 1.1, the stationary grip having an outerdiameter substantially equal to an outer diameter of an outboard end of the hand-rotatable grip.

4. A hand-rotatable grip for mounting about a handlebar having a longitudinal axis, the hand-rotatable grip comprising:
   a body having an inboard end and an outboard end and a length parallel to the axis, said body rotates about the longitudinal axis of the handlebar;
   a first region of the body adjoining the inboard and having a first radius;
   a second region of the body adjoining the first region and having a second radius greater than the first radius; and
   a third region of the body adjoining an outboard end of the second region and having a third radius less than the second radius.

* * * * *

UNITED STATES PATENT AND TRADEMARK OFFICE
CERTIFICATE OF CORRECTION

PATENT NO. : 6,389,929 B1  Page 1 of 1
DATED : May 21, 2002
INVENTOR(S) : Ryan A. Calilung and Andrew J. Caron It is certified that error appears in the above-identified patent and that said Letters Patent is hereby corrected as shown below:

Column 1,
Line 29, delete "fill" and insert -- full --.

Column 3,
Line 59, delete "Lr-Ls" and insert -- Lr+Ls --.

Column 4,
Line 52, insert "end" after "outboard".

Column 5,
Line 2, insert a space between "outer" and "diameter".

Column 6,
Line 1, insert -- end -- after "inboard".

Signed and Sealed this

Twenty-third Day of July, 2002

*Attest:*

*Attesting Officer*

JAMES E. ROGAN
*Director of the United States Patent and Trademark Office*